(12) United States Patent
Champion et al.

(10) Patent No.: US 8,050,655 B2
(45) Date of Patent: *Nov. 1, 2011

(54) SYSTEMS AND METHODS FOR RESTRICTING THE USE OF STOLEN DEVICES ON A WIRELESS NETWORK

(75) Inventors: Laurenn L. Champion, Marietta, GA (US); John Scott Daniel, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/479,329

(22) Filed: Jun. 5, 2009

(65) Prior Publication Data

US 2009/0247131 A1    Oct. 1, 2009

Related U.S. Application Data

(63) Continuation of application No. 11/264,647, filed on Oct. 31, 2005, now Pat. No. 7,567,795.

(51) Int. Cl.
*H04M 1/66* (2006.01)
(52) U.S. Cl. ..................... 455/410; 455/411
(58) Field of Classification Search .......... 455/410–411, 455/403, 414.1, 422.1, 428, 432.2, 432.3, 455/433, 435.1, 445, 558, 560, 550.1–553.1, 455/415, 418–420; 235/385; 705/26; 379/114.14, 127.02, 145, 185, 189, 191
See application file for complete search history.

(56) References Cited

U.S. PATENT DOCUMENTS

| | | | | |
|---|---|---|---|---|
| 5,335,278 | A | * | 8/1994 | Matchett et al. .............. 380/248 |
| 6,061,558 | A | * | 5/2000 | Kennedy et al. .............. 455/411 |
| 7,567,795 | B1 | * | 7/2009 | Champion et al. ............ 455/410 |
| 2003/0216969 | A1 | * | 11/2003 | Bauer et al. .................... 705/22 |
| 2006/0009214 | A1 | * | 1/2006 | Cardina et al. ............ 455/432.3 |

* cited by examiner

*Primary Examiner* — Kamran Afshar
*Assistant Examiner* — Yousef Rod
(74) *Attorney, Agent, or Firm* — Parks IP Law LLC; Mickki D. Murray, Esq.

(57) ABSTRACT

Systems and methods for controlling wireless network access for wireless devices are disclosed. A system can create an electronic record for a device intended for sale in a retail store. The record associated with the device can include an indication that the device has not been sold, and the device can be shipped to the retail store. When the device is purchased, the retail store can communicate to the wireless service provider that the device has been sold, and the system can update the electronic record to reflect that the device has been sold. The sold device can be allowed to access a network. An attempt to use a device marked as unsold can result in the call being routed to a fraud management center for verification of proper device purchase.

15 Claims, 5 Drawing Sheets

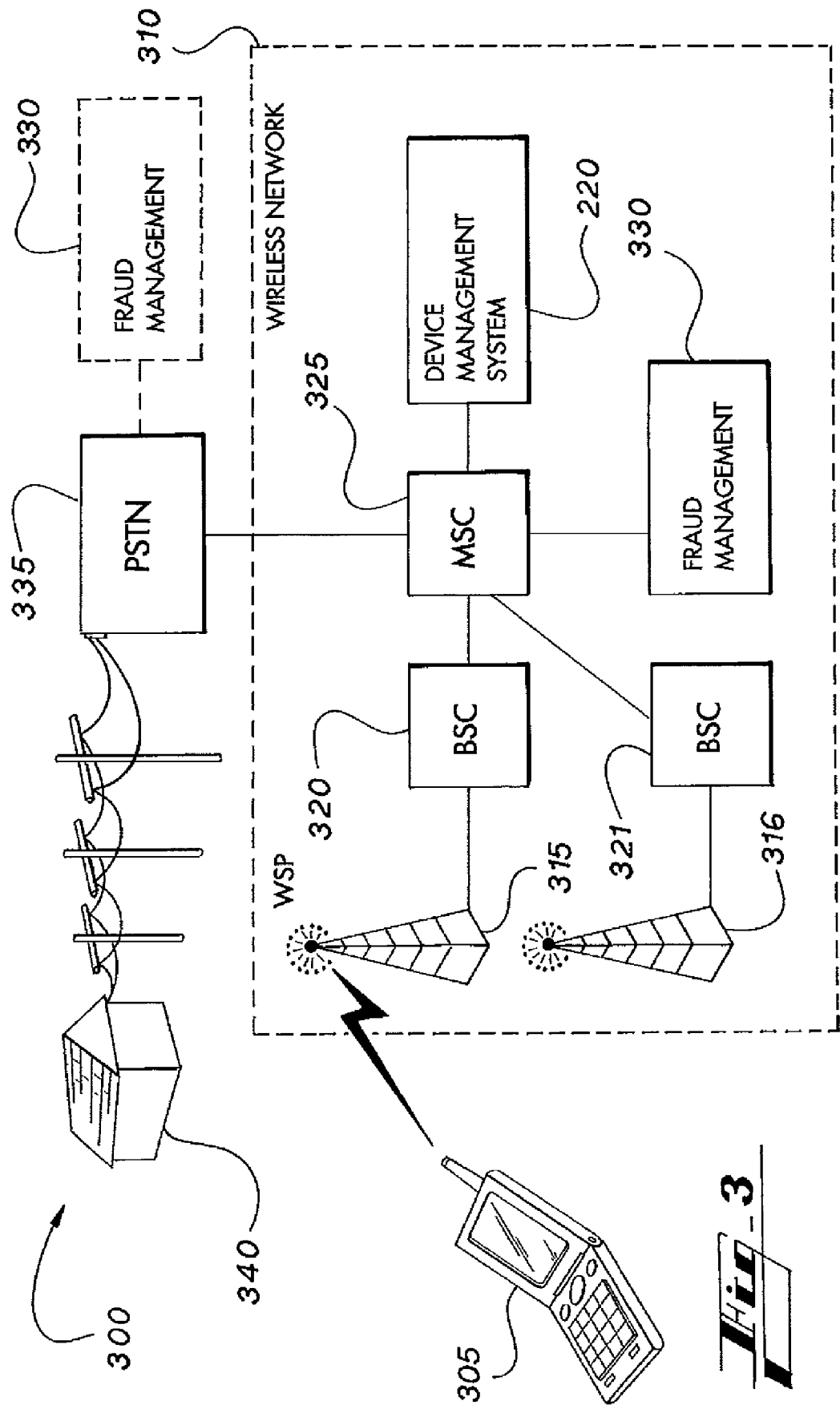

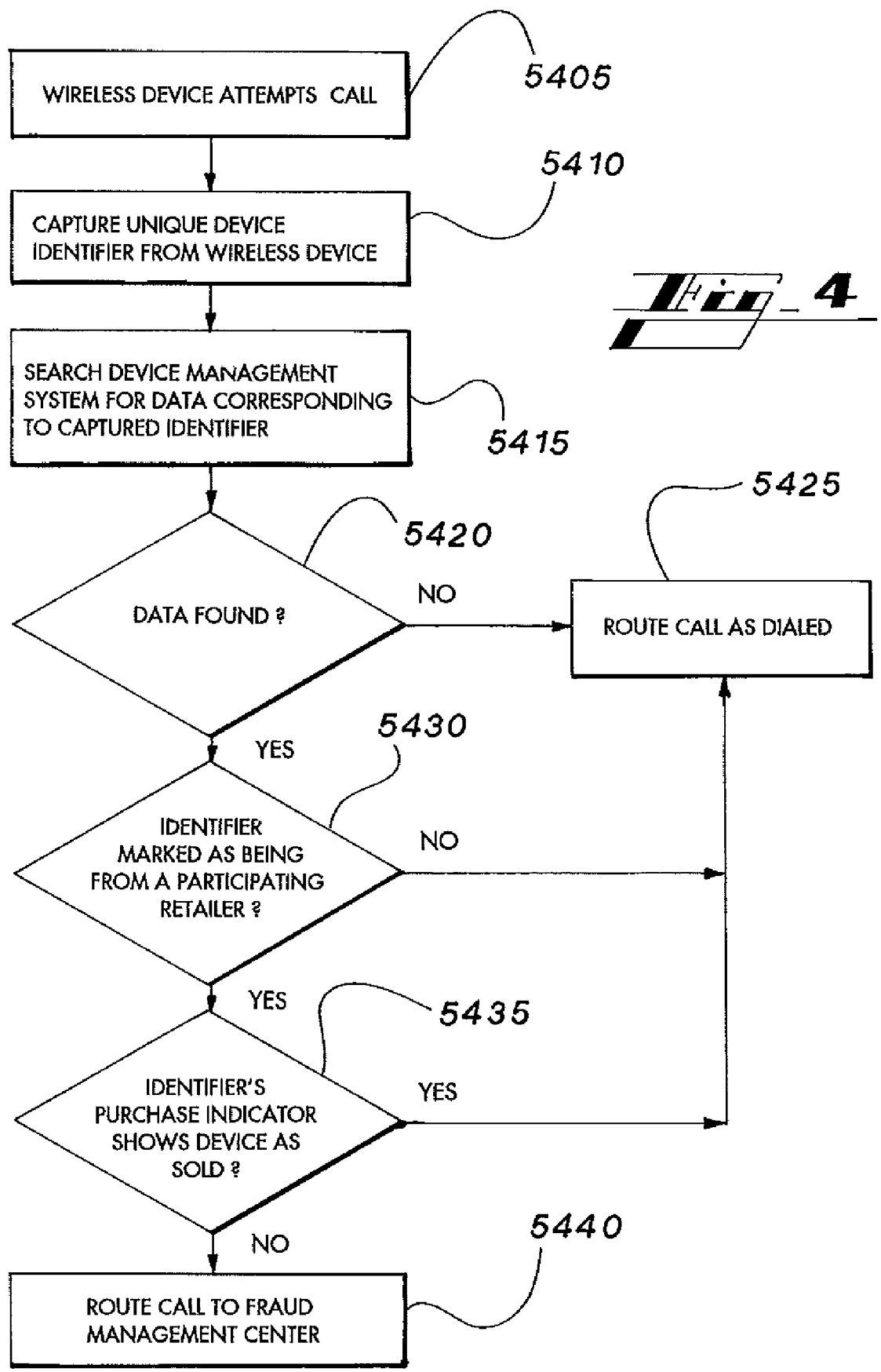

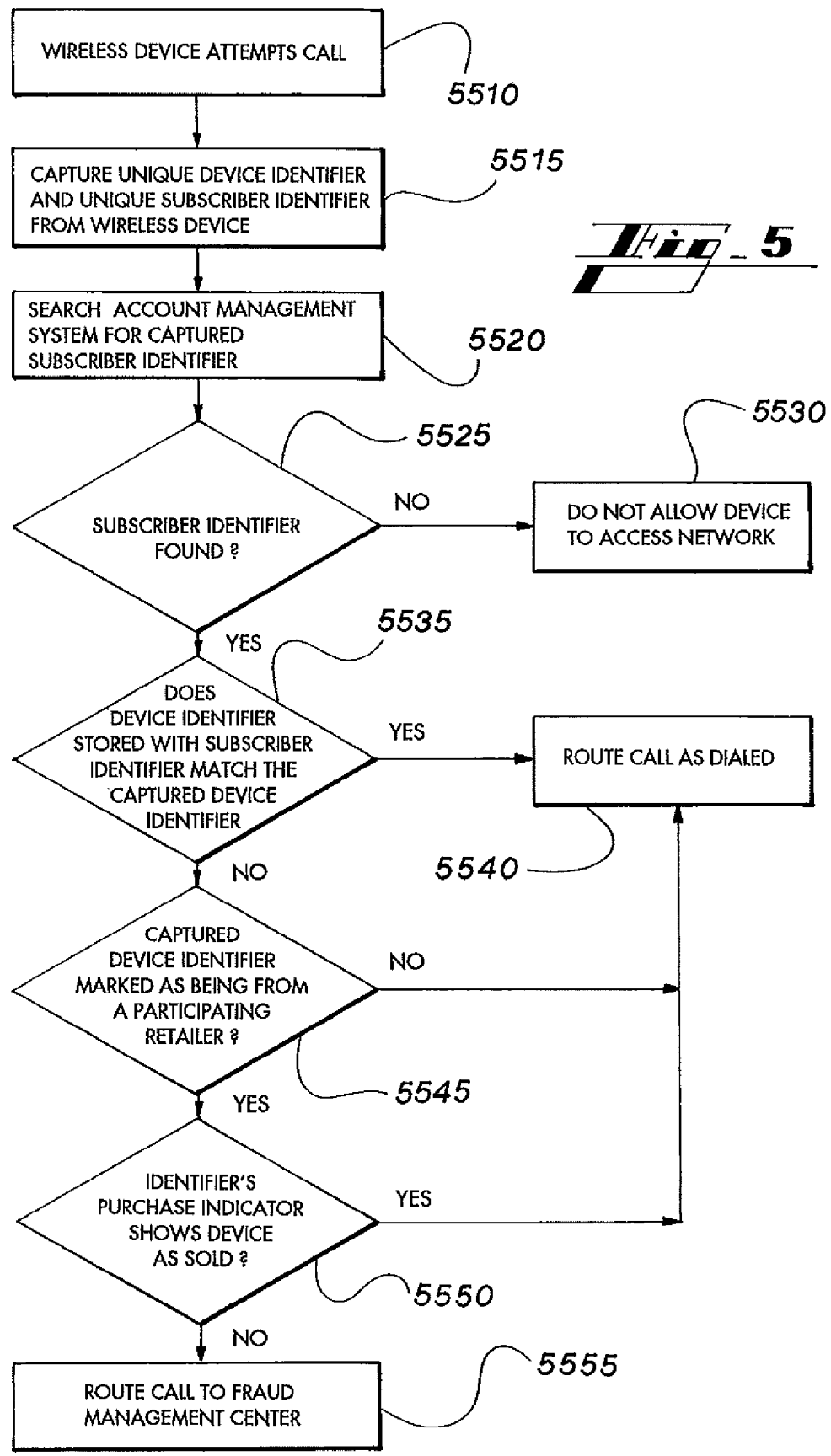

SYSTEMS AND METHODS FOR RESTRICTING THE USE OF STOLEN DEVICES ON A WIRELESS NETWORK

CROSS-REFERENCE TO RELATED APPLICATION

This application is a continuation of U.S. application Ser. No. 11/264,647, filed Oct. 31, 2005, and issued as U.S. Pat. No. 7,567,795, the entirety of which is herein incorporated by reference.

TECHNICAL FIELD

This disclosure relates generally to the field of wireless services and, more particularly, to restrictions on the use of stolen wireless devices on a wireless network.

BACKGROUND

Wireless telephone service has gained widespread acceptance and popularity throughout much of the modern world. Advanced technologies on the horizon will speed the delivery of data to and from mobile devices as well as make voice calls more reliable, further increasing the desirability of having access to wireless services. Many individuals are deciding to discontinue landline service altogether, relying solely on wireless service for telephone voice communications.

To meet the public demand for wireless access, wireless service providers have developed myriad service plans. These service plans generally fall into one of two categories, postpaid or prepaid. Postpaid access plans generally allow the mobile customer to use airtime during a period for which the customer is billed at a later date. Enrollment in such a plan can require a level of trust between the customer and the wireless service provider, who may, for example require a credit check to determine if the customer has a history of promptly paying his or her debts. Generally, devices are sold under these plans at a discounted rate, the discount being recouped over the term of a contract that the customer is required to enter. The contract binds the customer to purchase wireless service for a predetermined period of time. Such plans also generally charge a base rate for a certain number of included minutes of airtime and/or amounts of data that can be transferred. An increased rate is usually charged for additional minutes or data.

Prepaid plans, on the other hand, allow the customer to pay for the wireless service before it is used. This can allow customers who may have some negative credit history to receive wireless access without risk to the wireless service provider that the bill will go unpaid. Additionally, prepaid plans can be attractive to customers who do not wish to enter into a long term contract commitment. Such plans also can be used by those who want to avoid the risk of expending their allotment of base minutes and paying the increased rate thereafter.

Of course, before a customer can enroll in an access plan, the customer must own a wireless device. These devices can include cell phones, PDAs, and BLACKBERRY® handheld devices, among others. Newer devices are popular not only for wireless convenience, but also due to novelty and fashion considerations. Modern devices allow customers to download ring tones and video games, and to purchase accessories and upgrades.

Wireless devices can be found for sale in myriad locations such as, for example, mall kiosks, stores operated by wireless service providers, national office and computer supply stores, and other large national retailers. These locations may offer one or both of prepaid and postpaid plans with the devices that are offered for sale. The devices offered at these locations may be locked to a specific wireless service provider and also may be restricted under agreement between the reseller and the wireless service provider as to whether or not the devices can be activated as postpaid devices and/or prepaid devices.

Unfortunately, the popularity of wireless access has made wireless devices a tempting target for theft. By stealing a device, the thief avoids paying the upfront cost for the device itself and can call the wireless service provider to activate service for the device. Contract commitments are avoided as well. The thief may have difficulty activating the phone as a postpaid device due to credit history problems, but still may obtain prepaid service. Where postpaid phones are generally stored under a counter or locked away in a cabinet with only a sample phone on display, prepaid phones are often placed in boxes in customer-accessible areas. This can make prepaid phones more susceptible to theft by customers or even store employees. Not knowing that a new device has been stolen, the wireless provider can unwittingly allow the stolen device to access the network.

Some wireless architectures include provisions for combating theft. For example, the Global System for Mobile Communications (GSM) standard defines a unique device identifier for all compliant phones. This identifier is called an International Mobile Equipment Identifier (IMEI). GSM service providers can maintain a database of IMEI's that categorizes the status of the IMEI. For example, three status levels can be used, white, black, and gray. A white-listed device could be a device that has no suspicious activity associated with it. A gray-listed device could have some history of suspicious activity, but still may be allowed to access the network, and a blacklisted device could be a known stolen or rogue device. Wireless service providers may or may not limit device access in this manner.

The IMEI can be used, for example, when a paying customer's device is stolen from a car. The customer can call the GSM provider to report the stolen phone, and the GSM provider can blacklist the phone so that it is unable to access the network. The IMEI is known in this case because it was associated with the customer's account. GSM providers may share their IMEI lists so that a blacklisted phone cannot be used on any network and is thereby rendered useless. Some European wireless service providers limit access in this manner.

This method of restricting stolen device usage is effective in the scenario presented above, but may not be as helpful in the case of a new device stolen from a retail store. In the latter case, the retailer may not have the IMEI on record. Or, the retailer may not notice that the device has been stolen for quite some time, allowing the thief to use it in the interim. It also is possible that the retailer does not have the resources to devote to informing the wireless service provider that the device has been stolen. For example, it may cost more to pay staff members to watch inventories closely enough to detect the theft, determine which device was stolen and its IMEI, and then call the wireless service provider to blacklist the device than it costs to simply replace the stolen device. Even more troublesome for retailers, is the case wherein a staff member steals a device. Some retailers, indeed, may decide that due to the risk of theft, it is not worth offering the devices for sale at all. This is an unfortunate situation for the wireless service provider, the retailer, and honest paying customers.

SUMMARY

The various embodiments of the present disclosure overcome the shortcomings of the prior art by providing a reliable, convenient, and efficient way to identify a new device that has been stolen from a retail store, and to restrict the use of the stolen wireless device on a wireless network.

In one embodiment, the system includes a device management system for storing a purchase indicator with a unique device identifier in a computer readable memory. The device management system can be configured to receive the unique device identifier from a warehouse management system. The device management system further can be configured to receive an updated purchase indicator from a retail inventory system. If a device attempting to use the wireless network has a purchase indicator that shows that the device has not been sold, the system routes calls made by the device to a fraud management center.

An embodiment of a method according to the present disclosure includes capturing a transmitted device identifier from a wireless device attempting to access a wireless network, comparing the captured device identifier to a list of identifiers stored in memory to find a purchase indicator for the device, and routing the device to a fraud management center if the purchase indicator shows that the device has not been purchased.

Another embodiment of a method according to the present disclosure includes capturing a unique device identifier and a unique subscriber identifier from a wireless device attempting to access the network, comparing the captured device identifier with a device identifier stored with a subscriber identifier matching the captured subscriber identifier, and if there is no match, comparing the captured device identifier to a list of identifiers stored in memory to find a purchase indicator for the device, and routing the device to a fraud management center if the purchase indicator shows that the device has not been purchased.

The foregoing has broadly outlined some of the aspects and features of the present disclosure, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding of the disclosure may be obtained by referring to the detailed description of the exemplary embodiments taken in conjunction with the accompanying drawings, in addition to the scope of the disclosure defined by the claims.

BRIEF DESCRIPTION OF THE DRAWINGS

FIG. 3 is a block diagram showing a system for checking the purchase indicator of a device attempting to access the wireless network, according to an exemplary embodiment of the present disclosure.

FIG. 4 is a flow chart depicting a method of detecting a stolen device attempting to access the wireless network, according to an exemplary embodiment of the present disclosure.

FIG. 5 is a flow chart depicting a method of detecting a stolen device where the stolen device is attempting to access the wireless network using a valid subscriber identifier, according to an exemplary embodiment of the present disclosure.

DESCRIPTION

As required, detailed embodiments of the present disclosure are disclosed herein. It will be understood that the disclosed embodiments are merely examples to illustrate aspects of the disclosure that may be embodied in various and alternative forms. The figures are not necessarily to scale, and some features may be exaggerated or minimized to show details of particular components. In other instances, well-known materials or methods have not been described in detail to avoid obscuring the systems and methods described in the present disclosure. Therefore, specific structural and functional details disclosed herein are not to be interpreted as limiting, but as a basis for the claims and for teaching one skilled in the art to variously employ the present disclosure.

Figure 1:
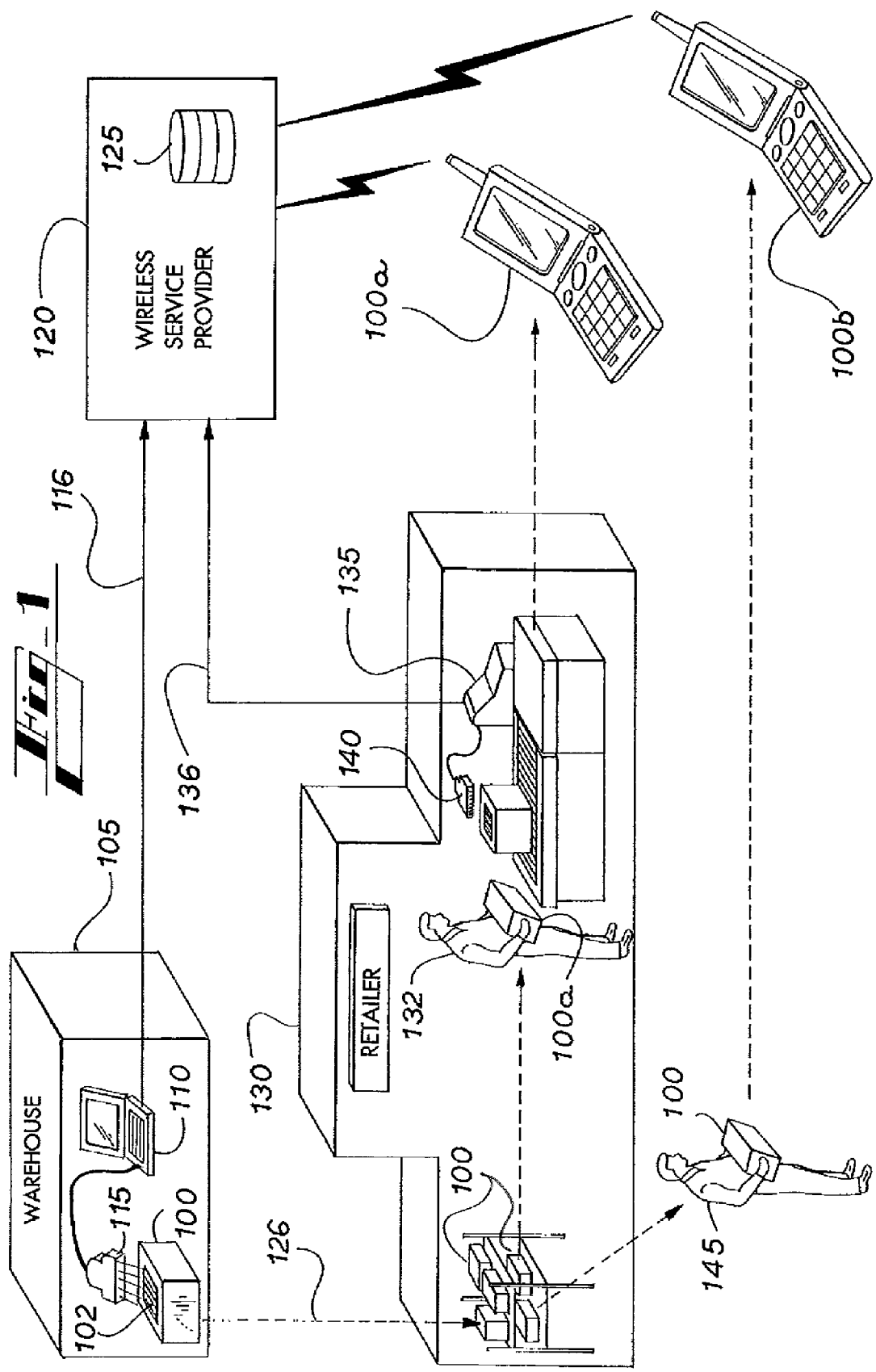
FIG. 1 is a diagram showing an exemplary environment for implementing exemplary systems and methods according to the present disclosure.

Referring now to the drawings, in which like numerals indicate like elements throughout the several views, FIG. 1 illustrates an exemplary environment for implementing exemplary embodiments of systems and methods according to the present disclosure. A wireless device, or in the embodiment depicted, a phone in a box (PIAB) 100, is shown located at a warehouse 105. The warehouse 105 can be a warehouse maintained by the wireless service provider, a manufacturer of wireless devices, a shipping company, or any other party that can store and/or ship wireless devices to resellers.

A computer system 110 is located at the warehouse 105. The computer system 110 can include an electronic reader 115 for reading the label 102 on the PIAB 100. This electronic reader 115 is illustrated as a barcode scanner, but it should be understood that the electronic reader 115 can be a radio frequency identification (RFID) tag reader, or any other reader capable of scanning or interrogating a tag or label on the PIAB 100. Likewise, the label 102 shown on the PIAB 100 can be any type of electronically readable tag or label such as, for example, a barcode. The barcode scanner 115 reads the barcode 102 on the PIAB 100 and returns the information read to the computer system 110.

The information included on the barcode 102 can include details regarding the phone, including the manufacturer, model number, date of manufacture, and place of manufacture. The information also can include a unique device identifier. This identifier also can be printed on the device itself and stored in computer readable memory inside the device.

For purposes of illustration, the Global System for Mobile Communications (GSM) standard device identifier, International Mobile Equipment Identifier (IMEI), will be used throughout the following discussion. However, one skilled in the art will understand that other unique device identifiers can be used such as an Electronic Serial Number (ESN), a Medium Access Control (MAC) Address, a Mobile Equipment Identity (MEID), or any other device identifier known in the art.

The computer system 110 communicates with the wireless service provider 120. The communication 116, includes the IMEI of the PIAB 100. The message sent can be formatted as an email, a text file, a Structured Query Language (SQL) database statement, SS7 signal, or any other wireless or wired format used for electronic communications. This communication can occur as the barcode 102 on the PIAB 100 is scanned, at timed intervals throughout a day, once a day in a nightly download, for example, or at any other interval. The communication can be initiated by the computer system 110 or the wireless service provider 120.

The IMEI transferred to the wireless service provider 120 is then stored in a database 125 where it is marked as corresponding to a device that has not been sold to the end user. The wireless service provider 120 can make this designation based on the origin of the information (i.e., a warehouse). Alternatively, the communication from the warehouse could include this designation, for example, in a comma delimited text file that includes values that correspond to fields in a database table, or in an SQL statement such as an INSERT statement.

The PIAB 100 is then shipped to the retailer 130, as indicated by dashed line 126. The retailer 130 can be any reseller of the wireless devices. The retailer places the PIAB 100 on display for sale. The display can include a number of PIAB's 100. Such a display can advertise the PIAB's 100 as prepaid phones (user pays for wireless service upfront) or as postpaid phones (user periodically pays for wireless service after airtime has been used). At this point, each of the PIAB's 100 on display has an IMEI that is marked as unsold in the database 125.

The customer 132 picks up a PIAB 100 and proceeds to the checkout counter to purchase the PIAB 100. At checkout, the barcode 102 on the PIAB 100 is scanned by the retailer's point of sale computer 135 using the electronic reader 140. As mentioned previously with regard to the electronic reader 115, the electronic reader 140 can be any type of reader known in the art. The customer 132 pays for the PIAB 100. The retailer's point of sale computer 135 communicates with the wireless service provider 120. The communication 136 includes the IMEI of the PIAB 100 that was just purchased. The communication 136 indicates that the PIAB 100 has now been sold. The information can be sent in any of the methods noted above for sending the communication 116. In this case, however, regarding the timing of the communication 136, it may be preferable to send the information at the time the PIAB 100 is purchased, since the customer 132 may wish to activate the phone immediately. The database 125 is updated to reflect that the IMEI transferred to the wireless service provider 120 corresponds to a phone that has been sold.

In the illustrated example, the customer 132 leaves the store with the purchased phone 100a. Instead of purchasing a PIAB 100 on display, a thief 145 absconds from the retailer 130 with a PIAB 100.

The customer 132 opens the box and removes the purchased phone 100a. The purchased phone 100a is turned on and the customer 132 attempts to activate the purchased phone 100a. Upon registering with the wireless network, the purchased phone 100a transmits its IMEI. The database 125 is then queried for the transmitted IMEI. The query returns a purchase identifier from the database indicating a sold status for the purchased phone 100a corresponding to that IMEI. The purchased phone 100a is activated on the network. When the customer 132 attempts to place a call, the phone call is routed as dialed.

The thief 145 opens the box containing the stolen phone 100b and attempts to activate the stolen phone 100b. The stolen phone 100b sends its IMEI to the wireless service provider 120. The IMEI is captured by the wireless service provider 120. The database 125 is queried for the captured IMEI and the query returns a purchase identifier indicating a not sold status for the stolen phone 100b. When the thief 145 attempts to place a call on the network, the call is not routed as dialed. The call can be routed, for example, to a wireless service provider fraud management center.

TABLE 1

| Location of device in commerce stream | Unique Device ID | Purchase Indicator |
|---|---|---|
| At warehouse and before sale to end user. | 123456789012345 | NS |
| After sale to end user | 123456789012345 | S |

Table 1 provides an example of a data association between a purchase indicator and a unique device identifier. In this context, an association means a logical link or relationship created in a computer memory, for example, in a record in a computer database such as, for example, the database 125. The first column represents the location of the device in the stream of commerce. The second column represents the unique device identifier and the third column shows a purchase indicator that indicates whether the device has been marked as sold by a reseller. This data can be stored as a record by the wireless service provider 120 in a separate table having the unique device ID as its primary key. Alternatively, the purchase indicator can be stored in an existing table containing device, account, and/or subscriber information.

Some retailers, however, may not wish to participate in the stolen device restriction program due to cost and/or convenience issues regarding the program's implementation. Some may decide to risk having a thief leave their premises with an operational phone. If all phones shipped from the warehouse are marked NS and some non-participating retailers exist, then the device would not be updated at the point of sale. The purchaser would not be able to activate the phone. Since all retailers may not wish to participate in the program, it can be preferable to associate additional data with the unique device identifier. This can provide consistency at the warehouse and give the wireless service provider additional options for tracking the sale of wireless devices.

TABLE 2

| Unique Device ID | Allowed Activation | Retailer Participation Type | Purchase Indicator | Active Status | Shipped to Code | Activated by Code | Activated As |
|---|---|---|---|---|---|---|---|
| 123456789012345 | PO—Prepaid Only<br>AA—Any Activation | P—Participating<br>NP—Non-Participating<br>PP—Participating Postpaid | S—Sold<br>NS—Not Sold | A—Active<br>I—Inactive | Code Identifying Recipient of device | Code Identifying Activating Entity | Pre—Prepaid Activation<br>Post—Postpaid Activation. |

Table 2 provides an example of a data format that can be used to allow retailers to choose whether to participate in the program, without preventing activation of devices sold by retailers choosing not to participate in the program. The unique device ID is associated in Table 2 with seven items of data: Allowed Activation, Retailer Participation Type, Purchase Indicator, Active Status, Shipped to Code, Activated by Code, and Activated As. The Allowed Activation Type can either be PO for prepaid only, or AA for any activation. This indicates the type of billing arrangement that the wireless service provider will allow for the associated device. The Retailer Participation Type can either be P for participating, NP for non-participating, or PP for participating postpaid. The Retailer Participation Type field indicates whether or not the retailer that the phone is being shipped to participates in the stolen phone restriction program. The Purchase Indicator can be S for sold, or NS for not sold. The Active Status indicates whether or not the phone as been activated on the wireless network for service. It can be A for active or I for inactive. The Shipped to Code is an identifier for the retailer intended to receive the device from the warehouse. The Activated By Code is used to indicate the entity that activated the device. After activation by the retailer, for example, this can be the same as the Shipped to Code. Another code can be used to indicate that an individual activated the phone by calling the wireless service provider. The Activated As field indicates the manner of billing that was set up at the time the phone was activated.

configuration which will set the other values accordingly. A shipped to code can be entered, which can have the values preset to meet a recipient's saved profile. The package scanner 210 can be used to capture data and set parameters for a single PIAB 100 or a series of PIAB's 100. For example, the package scanner 210 can be set to scan thirty phones that are to be shipped to retailer ABC. The package scanner 210 can have a saved profile for retailer ABC (or such a profile can be downloaded from the warehouse management system 205). By choosing "ship to code" "ABC," the package scanner 210 can set "allowed activation" to "PO" and "participation type" to "P." The "purchase indicator" will be set to "NS" and "active status" to "I."

The package scanner 210 then can instruct a user through a package scanner display or other output device 214 to scan the first item. The user can scan an item and the package scanner 210 can instruct the user to scan another item or press a button to indicate that no more packages with the current settings are to be scanned.

Data for the scanned PIAB's 100 can be stored in the memory 212 of the package scanner 210 and then transferred

TABLE 3

| Shipped Device Configuration | Allowed Activation | Participation Type | Purchase Indicator | Active Status | Shipped to Code | Activated by Code | Activated As |
|---|---|---|---|---|---|---|---|
| Participating Prepaid | PO | P | NS | I | ABC | — | — |

Table 3 shows initial values for a prepaid device to be shipped from the warehouse 105 according to the data format presented in Table 2. The allowed activation is prepaid only, the participating type is participating, and the purchase indicator is set to NS (not sold). The Active Status is initially set to I since the phone has not yet been activated. The Shipped to Code is listed as "ABC," which is meant to indicate an arbitrary retailer that participates in the stolen phone restriction program. The Activated by Code and Activated As fields are not populated since the device had not been activated.

Figure 2:
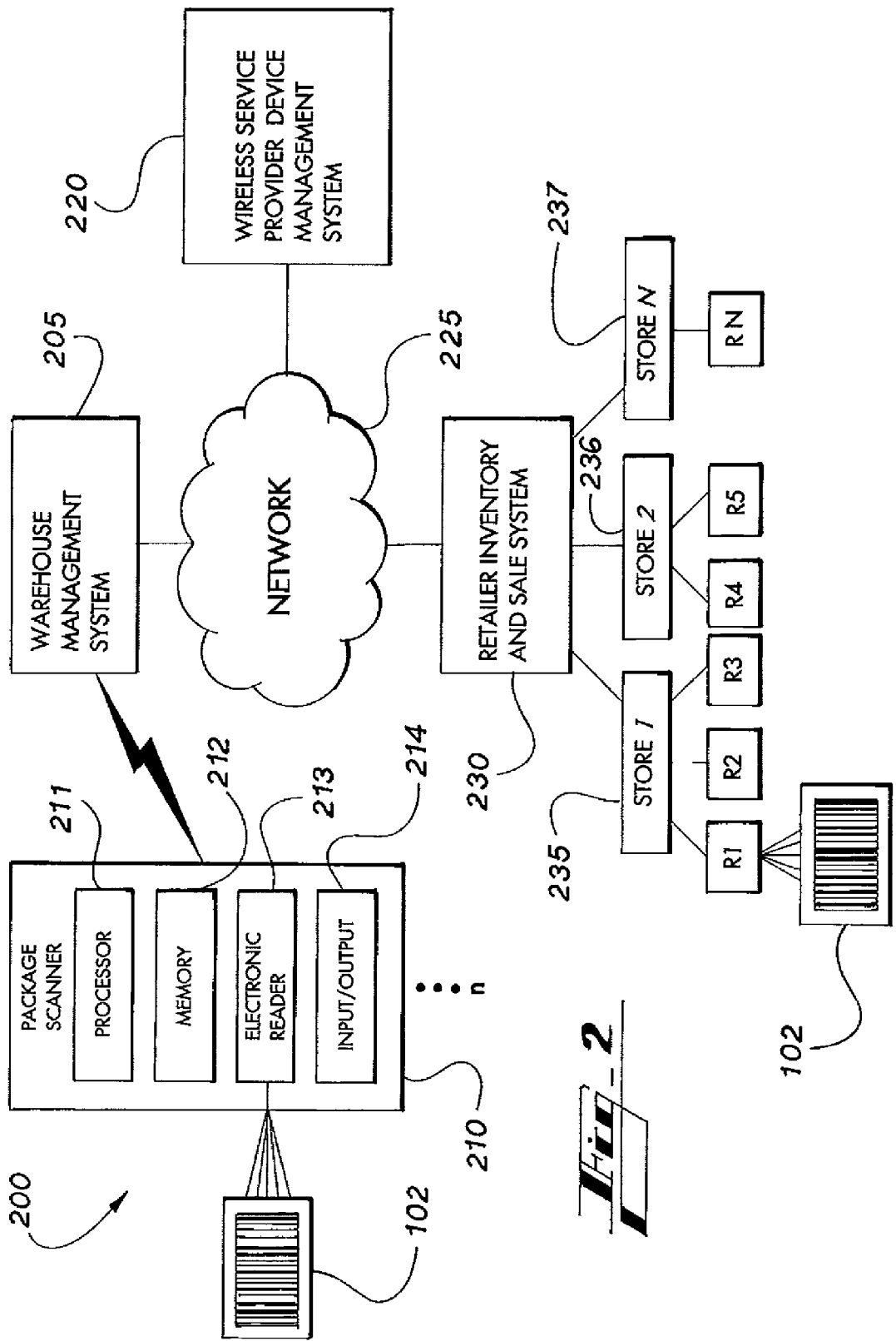
FIG. 2 is a block diagram showing a system for creating and updating a purchase indicator for wireless devices sold at a retail location, according to an exemplary embodiment of the present disclosure.

FIG. 2 shows a system 200 for creating and updating a purchase indicator for wireless devices sold at a retail location. A warehouse management system 205 communicates with one or more package scanners 210. Each of the package scanners 210 can have a processor 211, a computer readable memory 212, an electronic reader 213 and an input/output system 214. The package scanners 210 can communicate wirelessly with the warehouse management system 205. Although a wireless embodiment is shown, the package scanners 210 can be wired to the warehouse management system 205, and can use a processor and memory of the warehouse management system 205 in lieu of being standalone units.

The electronic reader 213 can be any type of reader capable of capturing data from a label or tag and providing this data to the processor 211 of the package scanner 210. Examples of such readers 213 are optical readers than can scan data from barcodes and radio frequency identification tag readers. One of skill in the art will recognize that the use of other readers is within the scope of the present disclosure. The electronic reader 213 is used to read the label 102, shown, in this example, as a barcode attached to a PIAB 100. The barcode 102 contains a unique device identifier such as an IMEI. This information is provided to the processor 211.

The package scanner 210 can include a keyboard or other input device 214 to allow a user to enter the destination of the PIAB 100 where the device is to be shipped. The user also can enter parameters such as an allowed activation, and a participation type. Alternatively, the user can enter a shipped device to the warehouse management system 205. The warehouse management system 205 can include a database for storing shipment information for shipments from the warehouse.

Either immediately, or through irregular or periodic updates initiated by either the warehouse management system 205 or the wireless service provider device management system 220, the unique device identifiers for the scanned PIAB's 100 and any associated information is transferred over the network 225 from the warehouse management system 205 to the device management system 220. The network 225 can be a private network or a public network such as the Internet. The device management system 220 can include a database where the PIAB 100 information is stored.

The retailer inventory and sale system 230 can communicate with the device management system 220 over the same network 225 or another network (not shown). For a large retail chain that includes many stores, the inventory and sale system 230 can be connected to a plurality of stores 235, 236, 237. These stores can have registers R1-RN Each register R1-RN includes an electronic reader that is capable of reading the unique device identifier from a PIAB 100.

In the scenario of a proper purchase, a customer takes the device in its box to the checkout counter where is it is purchased at a register. The register reads the unique device identifier when the device is scanned and sends an electronic communication to the inventory and sale system 230. The inventory and sale system 230 can then send an electronic message over the network 225 to the device management system 220 that includes the unique device identifier of the PIAB 100 to indicate that the device has been sold. This communication preferably happens soon after the purchase as the customer may want to activate the phone immediately following the purchase. It should be understood that in some embodiments, the retail inventory and sale system 230 may be located at the same location as the register. The device management system 220 can update its database containing the unique device identifier (IMEI for the GSM example described above) to change the purchase indicator to from "NS" for "not sold" to "S" for "sold." The purchaser of the phone can activate the phone without being routed to a fraud management center once this has occurred. Once the phone is activated, the Active Status can be updated from inactive "I" to active "A."

In the case of a theft, the purchase indicator remains set to "NS" in the device management system.

In one embodiment of the present disclosure, the device management system 220 can receive a message from the warehouse management system 205 containing the unique device identifiers of PIAB's 100 that have no record of being shipped and have not recently appeared in an inventory update, for example, an inventory scan of all PIAB's 100 at the warehouse. The device management system 220 can be configured to set the purchase indicator of these unique device identifiers to "NS." This embodiment can be used to deter theft at the warehouse.

FIG. 3 shows a system 300 for checking the purchase indicator of a device 305 attempting to access a wireless network 310. The wireless network 310 includes one or more base stations 315, 316 and one or more base station controllers (BSC) 320, 321 that are connected to or are otherwise in communication with a mobile switching center (MSC) 325. The wireless network 310 includes a device management system 220 and can include a fraud management center 330 connected to the MSC 325. The MSC 325 is also connected to the public switched telephone network (PSTN) 335. The fraud management center 330 alternatively can be connected to the PSTN 335. A house 340 having telephone access is connected to the PSTN 335.

The device 305 attempts to place a call on the wireless network 310. In placing the call, the device 305 transmits its unique device identifier, among other data, to the base station 315. The BSC 320 captures the identifier and forwards it to the MSC 325. The MSC 325 forwards the identifier to the device management system 220. The identifier can be passed, for example, in a call detail record (CDR). The device management system 220 checks the purchase indicator to see of the device 305 is marked as sold. If the device 305 is marked as sold, the device management system 220 can instruct the MSC 325 to route the call as dialed, for example to the house 340 or to another wireless device on the wireless network 310.

If the purchase indicator corresponding to the unique device identifier shows that the device 305 has not been sold, the device management system 220 can instruct the MSC 325 to route the call to the fraud management center 330. Representatives in the fraud management center 330 can inform the caller that the device 305 is listed as unsold and request proof of purchase. If the caller is unable to provide proof of purchase by, for example, sending a copy of the receipt for the phone via facsimile, the caller is instructed to contact the place of purchase to resolve the issue. If the caller can provide proof of purchase, representatives in the fraud management center 330 can update the device management system 220 to change the purchase indicator for the unique device identifier associated with the device 305 to "S" for sold or perform other operations in order to override the routing of calls from the device 305 to the fraud management center 330 in the future.

FIG. 4 is a flowchart describing a method 400 of detecting a stolen device attempting to access the wireless network according to the present disclosure. The method 400 begins at step 405 when a wireless device attempts to place a call on the wireless network. At 410 the unique device identifier is captured from the device attempting to place the call. At 415 the device management system is searched for a matching identifier. The outcome of decision block 420 depends on whether or not a matching identifier is found. If no matching identifier is found, the call is routed as dialed and the method 400 ends at 425. If no identifier is found, the phone can be, for example, an older phone that was sold before systems and methods of the present disclosure were implemented. The call is routed as dialed so as not to interfere with the operation of these devices.

If the identifier is found in the device management system, operation continues to decision block 430 where the "participation type" field is checked to see if the device associated with the identifier is marked as having been shipped to a participating retailer. If not, then the call is routed as dialed and the method 400 ends at 425. If the device is marked as having been shipped to a participating retailer the method 400 continues to decision block 435.

At 435, the purchase indicator for the device associated with the unique device identifier is checked. If the purchase indicator shows that the device has been sold, the call is routed as dialed and the method 400 ends at step 425. If the purchase indicator shows that the device has not been sold, the method 400 ends at 440 where the call is routed to a fraud management center.

FIG. 5 shows a method 500 of detecting a stolen device where the stolen device is attempting to access the wireless network using a valid subscriber identifier. In addition to a unique device identifier, wireless networks also can utilize a unique subscriber identifier. In the case of a GSM network, the removable subscriber identity module (SIM) card inside of a phone. The SIM card contains the international mobile subscriber identifier (IMSI) which is used to associate a billing account with a wireless subscriber. A SIM card that is associated with an active wireless account can be removed from one phone and placed in another compatible phone. This allows a subscriber to place wireless calls to and/or from the second phone that are billed to the account associated with the SIM card.

This functionality creates a situation where a current subscriber could use a stolen phone by simply removing the SIM card from an old phone and placing it into the stolen phone. The method 500 shown in FIG. 5 prevents a stolen phone from being used in this way. In this embodiment, an account management system is included in the wireless network that contains an association between a subscriber, an account, and a subscriber identification number (such as an IMSI located on the subscriber's SIM card). The account management system also can include an association between a subscriber identification number and a device identification number used by the subscriber. Alternatively, the device management system includes such an association.

The method 500 begins at 510 where a wireless device attempts to place a call on a wireless network. The network captures a unique device identifier and a unique subscriber identifier from the wireless device at 515. At 520 the account management system is searched for the captured subscriber identifier. Operation proceeds to decision step 525. The outcome of decision step 525 depends on whether or not the subscriber identifier was located in the account management system. If the subscriber identifier was not found the device is not allowed to place the call, and the method 500 stops at 530. For legacy devices that do not transmit a subscriber identity, the subscriber identity can be determined from account information as is known in the art. If no subscriber identifier is found in the account management system then no one can be billed for the call. The call is therefore not allowed. Alternatively, a phone placing such a call can be locked, or the call can be forwarded to a fraud management group, a recorded message, or be handled as otherwise known in the art.

If the subscriber identifier is found, processing continues to 535 where the account management system is queried to determine if the device identifier associated with the subscriber identifier in the account management system matches the device identifier captured from the wireless device attempting the call. Alternatively, the device management system can be checked for this information if the association is stored there. It should be understood that in some embodiments the account management system and the device management system may be integrated, for example, on the same server, or in the same database. If the device identifiers match, the call is routed as dialed and the method 500 ends at 540.

If the two device identifiers do not match, then processing continues to 545. If the identifiers do not match, then it means that the subscriber is attempting to access the network using a phone other than the one previously used to place calls. At 545 the "participation type" field corresponding to the captured device identifier is checked in the device management system to see if the device is marked as having been shipped to a participating retailer. If it is not, then the method 500 ends at 540 and the call is routed as dialed. If the device is marked as having been sold to a participating retailer, then processing continues to 550.

At 550, the purchase indicator for the device is checked to see if it is marked as sold or not sold. If the purchase indicator shows that the device has been sold, the method 500 ends at 540 and the call is routed as dialed. If the purchase indicator shows that the device has not been sold, the call is routed to a fraud management center at 555.

The present disclosure has been illustrated in relation to particular embodiments that are intended in all respects to be illustrative rather than restrictive. Those skilled in the art will recognize that the present disclosure is capable of many modifications and variations without departing from the scope of the disclosure.

Those skilled in the art also will appreciate that the system and methods described represent only examples of the various configurations that will be suitable for implementation of the various embodiments of the disclosure.

It must be emphasized that the law does not require and it is economically prohibitive to illustrate and teach every possible embodiment of the present claims. Hence, the above-described embodiments are merely exemplary illustrations of implementations set forth for a clear understanding of the principles of the disclosure. Many variations and modifications may be made to the above-described embodiments without departing from the scope of the claims. All such modifications, combinations, and variations are included herein by the scope of this disclosure and the following claims.

We claim:

1. A system for restricting the use of a wireless device on a wireless network, the system comprising:
    a wireless network device management system comprising a computer readable memory and a processor, the wireless device management system being configured to:
        receive, from a warehouse management system, a device identifier associated with the wireless device;
        store the device identifier in the computer readable memory with a purchase indicator, wherein the purchase indicator initially is set to indicate that the wireless device has not been sold;
        receive a calling device identifier from the wireless network, the calling device identifier corresponding to a calling wireless device that is attempting to make a call using the wireless network; and
        instruct the wireless network to route voice calls from the calling device to a fraud management center if the purchase indicator shows that the device has not been sold, wherein the calling device identifier is captured by the network and transferred to the device management system.

2. The system of claim 1, wherein the device management system is further configured to:
    receive an updated purchase indicator from a retail inventory system for the device identifier, the updated purchase indicator comprising data that indicates that the wireless device has been sold; and
    store the updated purchase indicator in the computer readable memory with the device identifier.

3. The system of claim 1, wherein the warehouse management system further comprises:
    an electronic reader, the electronic reader being configured to electronically read a unique device identifier of a wireless device; and
    a warehouse management processor configured to receive the device identifier from the electronic reader and transmit the device identifier to the device management system.

4. The system of claim 3, wherein the warehouse management system is configured to transmit the device identifier to the device management system if the device identifier corresponds to a device that:
    has no record of shipment in the warehouse management system; and
    has not appeared in at least one inventory scan of a corresponding warehouse.

5. The system of claim 1 further comprising a retail inventory system, the retail inventory system comprising:
    an electronic reader, the electronic reader being configured to electronically read a device identifier of a wireless device; and
    a retail inventory processor, the retail inventory processor being programmed to receive the device identifier from the electronic reader and transmit the device identifier to the device management system with an updated purchase indicator that shows the device as being sold.

6. The system of claim 1, wherein the device identifier comprises data indicating an IMEI of the wireless device.

7. The system of claim 1, wherein the device identifier comprises data indicating a MAC address of the wireless device.

8. The system of claim 1, wherein the device identifier comprises data indicating a device characteristic selected from a group consisting of an ESN, an MEID, and a UMID.

9. A method for routing calls in a wireless network, the method comprising:
    capturing a device identifier transmitted by a wireless device attempting to place a call using the wireless network;
    comparing the captured device identifier to a device identifier stored in a computer readable memory to determine if the stored device identifier matches the captured device identifier; and
    if the captured device identifier matches the stored device identifier:
        retrieving, from the computer readable memory, a purchase indicator stored with the stored device identifier; and
        routing a call to a fraud management center if the purchase indicator comprises data indicating that a device has not been sold.

10. The method of claim 9, wherein the device identifier comprises data indicating an IMEI of the wireless device.

11. A package scanner for electronically marking a wireless device as not sold, the packaging scanner comprising an electronic reader and a computer readable memory, wherein the package scanner is configured to:
- obtain, using the electronic reader, a device identifier associated with a wireless device;
- store, at the computer readable memory, the device identifier and a purchase indicator, the purchase indicator comprising data that indicates that the device has not been sold; and
- store, at the computer readable memory, a participation type indicator, the participation type indicator comprising data that indicates whether an intended shipping recipient of the wireless device participates in a stolen device restriction program.

12. The package scanner of claim 11, wherein the package scanner is further configured to store, at the computer readable memory, a shipping destination code, the shipping destination code comprising data that indicates a destination to which the wireless device is to be shipped.

13. A method for connecting a wireless device with a fraud management center, the method comprising:
- determining, at the wireless communications network, that the wireless device is stolen, wherein determining that the wireless device is stolen comprises:
  - comparing a received device identifier with a device identifier stored in a computer readable memory to determine if the stored device identifier matches the received device identifier; and
  - if the received device identifier matches the stored device identifier, retrieving, from the computer readable memory, a purchase indicator stored with the stored device identifier; and
- in response to determining that the purchase indicator comprises data indicating that a device associated with the received identifier has not been sold, routing a call to the fraud management center.

14. The method of claim 13, wherein receiving the device identifier comprises receiving, at the wireless communications network, an IMEI of the wireless device.

15. The method of claim 13, wherein routing a call to the fraud management center includes routing the call originating at the wireless device to the fraud management center.

* * * * *